US011757751B2

(12) United States Patent
Friman et al.

(10) Patent No.: US 11,757,751 B2
(45) Date of Patent: *Sep. 12, 2023

(54) DETECTION OF NETWORK MEASUREMENT INACCURACIES

(71) Applicant: Juniper Networks, Inc., Sunnyvale, CA (US)

(72) Inventors: Marcus Jan Friman, Lulea (SE); Fredrik Anders Kers, Lulea (SE)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/364,178

(22) Filed: Jun. 30, 2021

(65) Prior Publication Data

US 2023/0006911 A1     Jan. 5, 2023

(51) Int. Cl.
*H04L 43/50*     (2022.01)
*H04L 43/106*     (2022.01)
(Continued)

(52) U.S. Cl.
CPC .......... *H04L 43/50* (2013.01); *H04L 43/0852* (2013.01); *H04L 43/0858* (2013.01);
(Continued)

(58) Field of Classification Search
CPC . H04L 43/50; H04L 43/0852; H04L 43/0858; H04L 43/0829; H04L 43/08;
(Continued)

(56) References Cited

U.S. PATENT DOCUMENTS 6,625,764 B1 * 9/2003 Dawson ............... H04L 69/22
714/703
8,867,350 B2 * 10/2014 Dawson ............... H04L 43/50
370/230.1
(Continued)

FOREIGN PATENT DOCUMENTS

EP    1427137 A2    6/2004
EP    2429127 A1    3/2012
EP    2802103 A1    11/2014

OTHER PUBLICATIONS

U.S. Appl. No. 17/364,201, filed Jun. 30, 2021, naming inventors Friman et al.
(Continued)

*Primary Examiner* — Mohamed A. Wasel
*Assistant Examiner* — Rachel J Hackenberg
(74) *Attorney, Agent, or Firm* — Shumaker & Sieffert, P.A.

(57) ABSTRACT

The disclosure describes techniques for detecting network measurement inaccuracies through the detection of sender delays or packet drops. For example, a sender device of a test packet may determine whether the sender device is experiencing any issues in sending the test packet to a receiver device and notify a controller of the issues such that the controller may generate an indication that one or more Key Performance Indicator (KPI) measurements based on the test packets from the sender device are inaccurate and/or untrustworthy, remove the inaccurate KPI measurements, and/or adjust the inaccurate KPI measurements.

18 Claims, 7 Drawing Sheets

(51) Int. Cl.
*H04L 43/0852* (2022.01)
*H04L 43/06* (2022.01)
*H04L 41/142* (2022.01)
*H04L 41/0631* (2022.01)

(52) U.S. Cl.
CPC .......... *H04L 43/106* (2013.01); *H04L 41/064* (2013.01); *H04L 41/142* (2013.01); *H04L 43/06* (2013.01)

(58) Field of Classification Search
CPC ... H04L 43/0835; H04L 43/106; H04L 43/04; H04L 43/065; H04L 43/06; H04L 43/0823; H04L 43/16; H04L 41/142; H04L 2012/5628; H04L 47/32; H04L 12/2898; H04L 49/35; H04L 49/70; H04L 49/351; H04L 1/205; H04L 1/1835; H04L 1/244; H04L 1/242; H04L 49/55; H04L 43/00; H04L 43/0811; H04L 43/067; H04L 43/0847; H04L 43/0817; H04L 43/0864; H04L 41/064
See application file for complete search history.

(56) References Cited

U.S. PATENT DOCUMENTS

| | | | |
|---|---|---|---|
| 9,160,644 B1 | 10/2015 | Softer et al. | |
| 10,666,775 B1* | 5/2020 | Volpe | H04L 43/50 |
| 2013/0219052 A1* | 8/2013 | Prakash | H04L 41/08 709/224 |
| 2013/0343207 A1* | 12/2013 | Cook | H04L 43/0852 370/252 |
| 2014/0095711 A1 | 4/2014 | Kim et al. | |
| 2014/0269399 A1 | 9/2014 | Patel et al. | |
| 2014/0301215 A1 | 10/2014 | Somoskói et al. | |
| 2014/0328206 A1 | 11/2014 | Chan et al. | |
| 2016/0380859 A1* | 12/2016 | Edsall | H04L 43/106 370/252 |
| 2017/0201435 A1 | 7/2017 | Tan | |
| 2017/0288991 A1 | 10/2017 | Ganesh | |
| 2018/0234336 A1 | 8/2018 | Schumm et al. | |
| 2020/0195534 A1 | 6/2020 | Monetti et al. | |
| 2021/0399954 A1 | 12/2021 | Dabell et al. | |

OTHER PUBLICATIONS

U.S. Appl. No. 63/114,444, by William Wennerström et al., filed Nov. 16, 2020.
Office Action from U.S. Appl. No. 17/364,201, dated Jan. 7, 2022, 41 pp.
Response to Office Action dated Jan. 7, 2022, from U.S. Appl. No. 17/364,201, filed Apr. 7, 2022, 13 pp.
Office Action from U.S. Appl. No. 17/934,496 dated Jan. 6, 2023, 29 pp.
Extended Search Report from counterpart European Application No. 22179408.4 dated Nov. 30, 2022, 11 pp.
Response to Office Action dated Jan. 6, 2023 from U.S. Appl. No. 17/934,496, filed Apr. 5, 2023, 11 pp.
Chen et al., "IP Flow Performance Measurement Framework draft-chen-ippm-coloring-based-ipfpm-framework-06", Internet Engineering Task Force, IETF Network Working Group Internet-Draft, Mar. 2016, 17 pp.
Frost et al., "Packet Loss and Delay Measurement for MPLS Networks", Internet Engineering Task Force (IETF), RFC 6374.txt, Sep. 2011, 52 pp.
Notice of Allowance from U.S. Appl. No. 17/364,201, dated Jun. 24, 2022, 16 pp.
U.S. Appl. No. 17/934,496, filed Sep. 22, 2022, naming inventors Friman et al.
Notice of Allowance from U.S. Appl. No. 17/934,496 dated Jul. 12, 2023, 11 pp.
Response to Extended Search Report dated Nov. 30, 2022, from counterpart European Application No. 22179408.4 filed Jul. 4, 2023, 22 pp.

* cited by examiner

DETECTION OF NETWORK MEASUREMENT INACCURACIES

TECHNICAL FIELD

The disclosure relates to computer networks, and more specifically, to measuring network performance.

BACKGROUND

A computer network is a collection of interconnected computing devices that can exchange data and share resources. In some examples, the computing devices may provide services to measure network performance of a computer network. For example, the computing devices may exchange data to compute key performance indicators (KPIs), such as latency, inter frame gap (Inter Frame Delay Variation), jitter, packet loss, throughput, and the like.

For example, to measure the KPIs, computing devices may exchange test packets including timestamps to indicate the time at which the test packet is sent or received. For instance, to compute latency between devices, a sender device sends a test packet including a timestamp indicating the time at which the message is sent, and the receiver device may generate a timestamp indicating the time in which the message was received. The timestamps are used to compute latency and/or other KPIs for the network performance between the computing devices.

SUMMARY

In general, the disclosure describes techniques for detecting network measurement inaccuracies through the detection of sender delays or packet drops. Computing devices of a network are configured as measurement points (e.g., test agents) to measure network performance. For example, a test agent of a sender computing device (referred to herein as "sender device") may send a test packet to a test agent of a receiving device (referred to herein as "receiver device"), which in turn may use the test packet to compute one or more KPIs. As one example, the sender device may send a test packet including a timestamp indicating the time at which the test packet is sent (referred to herein as "sending timestamp"). When the receiver device receives the test packet, the receiver device generates a timestamp indicating the time at which the test packet is received (referred to herein as "receiving timestamp"). The receiver device may use the timestamps to compute one or more KPIs, such as latency. A controller may obtain the measured KPIs from the receiver device, and may output for display, e.g., via a graphical user interface, the measurements to a user or network administrator.

In some instances, a sender device may experience issues with sending the test packet, which may result in inaccurate and/or untrustworthy KPI measurements. For example, when sending a sending timestamp to a receiver device, an application of the sender device generates a test packet including a first timestamp indicating a time at which the test packet is generated by the application. The sender device forwards the test packet to a network interface (e.g., network interface card) of the sender device to output the test packet to the receiver device. The network interface may, in some instances, be delayed in sending the test packet including the sending timestamp to the receiver device. In another example, the sender device may experience a pause in the measurement process (referred to herein as "scheduling pauses"), such as when applications other than the test application are running on the sender device and need CPU cycles, where such pauses may cause the sender device to drop test packets due to queue overflows, for example. The receiver device may compute one or more KPI measurements based on the test packet without accounting for the sender delay or packet drops due to scheduling pauses, which may result in the controller presenting the one or more KPI measurements without any indication that the KPI measurements are not attributed to the network performance, but instead to sender issues.

In accordance with the techniques described herein, the sender device may determine whether the sender device is experiencing any issues in sending the test packet to the receiver device and notify the controller of the issues such that the controller may generate an indication that the one or more KPI measurements based on the test packets from the sender device are inaccurate and/or untrustworthy, remove the inaccurate KPI measurements, and/or adjust the inaccurate KPI measurements.

In examples where the sender device may experience delay in sending the test packet, the techniques describe the sender device obtaining a second timestamp from a kernel or hardware component of the network interface that indicates a time at which the test packet is actually output from the sender device (also referred to herein as "actual sending timestamp"). The sender device may compute a time difference value (also referred to herein as "delta") between the first timestamp (time test packet generated by application) and the second timestamp (time test packet output from sender device), and compare the time difference value with a threshold time value. If the sender device determines there is a sender delay issue (e.g., time difference value exceeds the threshold time value), the sender device sends a message to notify the controller of the sender delay issue, which in turn may, for example, generate and output for display a visual indication within the graphical user interface to indicate the one or more KPI measurements based on the test packets from the sender device are inaccurate and/or untrustworthy, or remove the KPI measurements.

In examples where the sender device experiences packet drops (e.g., due to scheduling pauses), the techniques describe the sender device obtaining from the network interface a count of test packets sent or dropped from the network interface. The sender device compares the number of sent packets from the network interface counter with the number of test packets sent from the test application, and sends a message to notify the controller of the result of the comparison.

For example, if the number of sent packets from the network interface counter is less than the number of packets sent from the test application, the sender device may notify the controller that the one or more KPI measurements based on test packets sent from the sender device are inaccurate, which in turn may generate and output for display an indication on the graphical user interface to indicate the KPI measurements are inaccurate and/or untrustworthy, or remove the KPI measurements. If the number of sent packets from the network interface counter is greater than the number of packets sent from the test application and the sender device detects one or more packet drops from the network interface, the sender device may notify the controller that the one or more KPI measurements based on test packets sent from the sender device may be inaccurate, which in turn may generate and output for display an indication (e.g., warning) on the graphical user interface to indicate the KPI measurements may be inaccurate and/or untrustworthy.

The techniques described herein may provide one or more technical advantages. For example, by implementing a device that detects sender issues and notifies a controller of the sender issues, the controller may present a user or network administrator with additional information to enable the user or network administrator to better assess the accuracy of the network measurements. This gives the user or network administrator the assurance that the network measurements accurately reflect the performance of the network and to doubt measurements that may seemingly be attributed to the network when the issue is actually attributed to the sender device.

In one example of the techniques described herein, a method comprises sending, by an application of a sender device and to a receiver device, a test packet including a first timestamp indicating a time at which the test packet is generated by the application; obtaining, by the sender device and from a network interface of the sender device, a second timestamp indicating a time at which the test packet is output from the sender device via the network interface; computing, by the sender device, a time difference value between the second timestamp and the first timestamp; comparing, by the sender device, the time difference value with a threshold time value; and sending, by the sender device and if the time difference value exceeds the threshold time value, a message to a controller to notify the controller that one or more performance measurements based on the test packet are inaccurate, wherein the controller is distinct from the sender device and the receiver device.

In another example of the techniques described herein, a sender device includes a network interface; and one or more processors operably coupled to a memory, wherein the one or more processors are configured to: send, by an application of the sender device and to a receiver device, a test packet including a first timestamp indicating a time at which the test packet is generated by the application; obtain, from a network interface of the sender device, a second timestamp indicating a time at which the test packet is output from the sender device via the network interface; compute a time difference value between the second timestamp and the first timestamp; compare the time difference value with a threshold time value; and send, if the time difference value exceeds the threshold time value, a message to a controller to notify the controller that one or more performance measurements based on the test packet are inaccurate, wherein the controller is distinct from the sender device and the receiver device.

In another example of the techniques described herein, a controller comprises one or more processors operably coupled to a memory, wherein the one or more processors are configured to: receive, from a receiver device that receives a test packet, one or more performance measurements determined by the receiver device based at least in part on the test packet; receive, from a sender device that sends the test packet to the receiver, a message to notify the controller that the one or more performance measurements are inaccurate due to internal delays of the sender device; and output for display an indication of the one or more performance measurements and an indication that the one or more performance measurements are inaccurate.

In another example of the techniques described herein, a method comprises sending, by an application executing on a sender device, and to a receiver device, one or more test packets; obtaining, by the sender device and from a network interface of the sender device, a count of packets sent from the network interface; obtaining, by the sender device and from the application, a count of the one or more test packets sent by the application; comparing, by the sender device, the count of packets sent from the network interface and the count of the one or more test packets sent by the application to obtain a result of the comparing; and sending, by the sender device, a message to a controller that notifies the controller of the result of the comparing.

In another example of the techniques described herein, a sender device includes a network interface; and one or more processors operably coupled to a memory, wherein the one or more processors are configured to: send, by an application executing on the sender device, and to a receiver device, one or more test packets; obtain, from a network interface of the sender device, a count of packets sent from the network interface; obtain, from the application, a count of the one or more test packets sent by the application; compare the count of packets sent from the network interface and the count of the one or more test packets sent by the application to obtain a result of the comparison; and send a message to a controller that notifies the controller of the result of the comparison.

In another example of the techniques described herein, a controller comprises one or more processors operably coupled to a memory, wherein the one or more processors are configured to: receive, from a receiver device that receives a test packet, one or more performance measurements determined by the receiver device based at least in part on the one or more test packets; receive, from a sender device that sends the one or more test packets to the receiver, a message that indicates an issue in sending the one or more test packets.

The details of one or more examples are set forth in the accompanying drawings and the description below. Other features, objects, and advantages will be apparent from the description and drawings, and from the claims.

DETAILED DESCRIPTION

Figure 1:
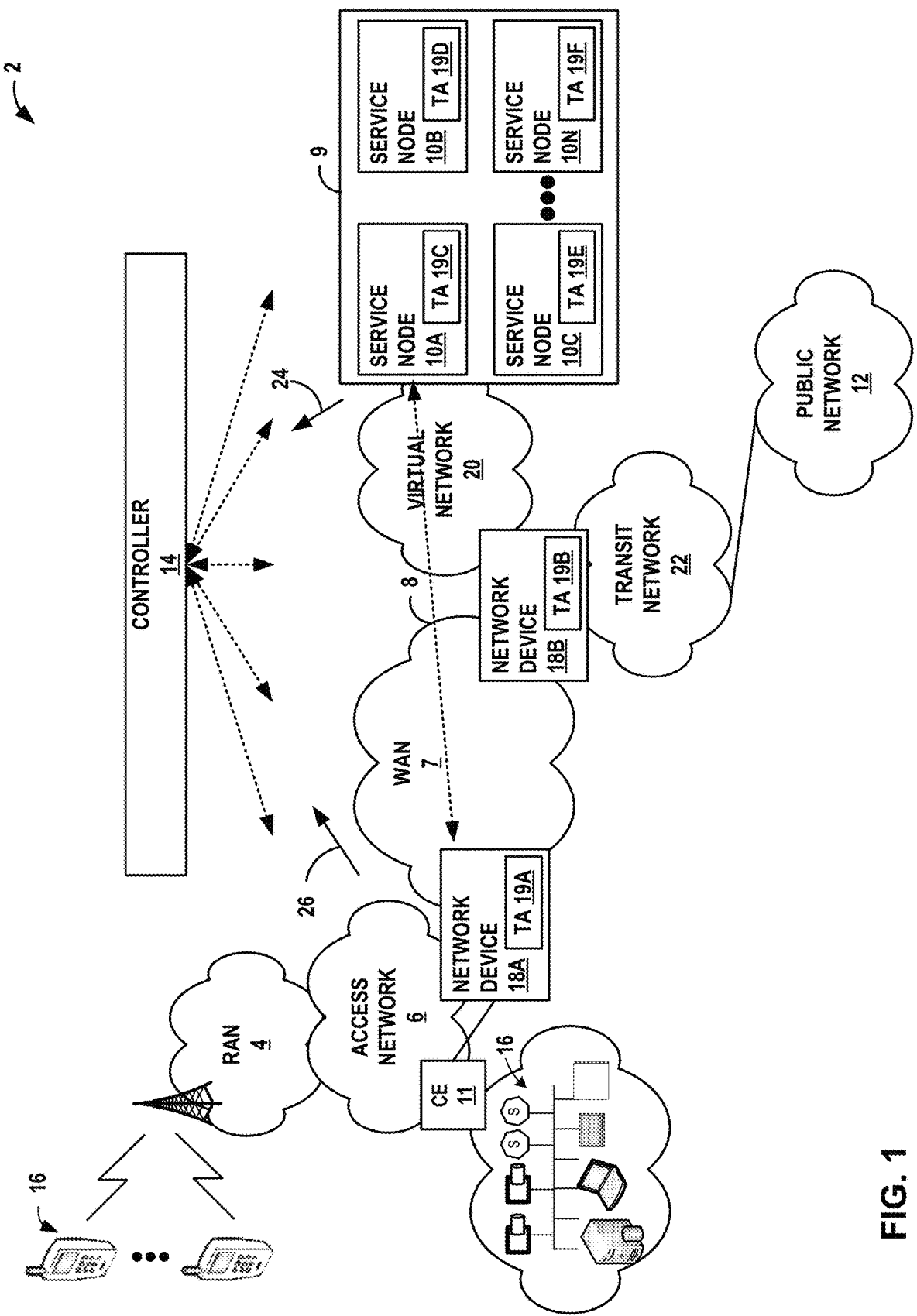
FIG. 1 is a block diagram illustrating an example network system that provides detection of network measurement inaccuracies, in accordance with one or more aspects of the techniques described in this disclosure.

FIG. 1 is a block diagram illustrating an example network system 2 ("network system 2") that provides detection of network measurement inaccuracies, in accordance with the techniques described herein.

Network system 2 may operate as a private network to provide packet-based network services to subscriber devices 16. That is, network system 2 provides authentication and establishment of network access for subscriber devices 16 such that a subscriber device may begin exchanging data packets with public network 12, which may be an internal or external packet-based network such as the Internet.

In the example of FIG. 1, network system 2 comprises access network 6 that provides connectivity to public network 12 via wide area network 7 (hereinafter, "WAN 7"). WAN 7 and public network 12 may provide packet-based services that are available for request and use by subscriber devices 16. As examples, WAN 7 and/or public network 12 may provide bulk data delivery, voice over Internet protocol (VoIP), Internet Protocol television (IPTV), Short Messaging Service (SMS), Wireless Application Protocol (WAP) service, or customer-specific application services. Public network 12 may comprise, for instance, a local area network (LAN), a wide area network (WAN), the Internet, a virtual LAN (VLAN), an enterprise LAN, a layer 3 virtual private network (VPN), an Internet Protocol (IP) intranet operated by the service provider that operates access network 6, an enterprise IP network, or some combination thereof. In various examples, public network 12 is connected to a public WAN, the Internet, or to other networks. Public network 12 executes one or more packet data protocols (PDPs), such as IP (IPv4 and/or IPv6), X.25 or Point-to-Point Protocol (PPP), to enable packet-based transport of public network 12 services.

In general, subscriber devices 16 connect to network devices 18A-18B (collectively, "network devices 18") via access network 6 to receive connectivity to subscriber services for applications hosted by public network 12. A subscriber may represent, for instance, an enterprise, a residential subscriber, or a mobile subscriber. Subscriber devices 16 may be, for example, personal computers, laptop computers or other types of computing devices positioned behind customer equipment (CE) 11, which may provide local routing and switching functions. Each of subscriber devices 16 may run a variety of software applications, such as word processing and other office support software, web browsing software, software to support voice calls, video games, video conferencing, and email, among others. For example, subscriber device 16 may be a variety of network-enabled devices, referred generally to as "Internet-of-Things" (IoT) devices, such as cameras, sensors (S), televisions, appliances, etc. In addition, subscriber devices 16 may comprise mobile devices that access the data services of network system 2 via a radio access network (RAN) 4. Example mobile subscriber devices include mobile telephones, laptop or desktop computers having, e.g., a wireless card, wireless-capable netbooks, tablets, video game devices, pagers, smart phones, personal data assistants (PDAs) or the like.

A network service provider operates, or in some cases leases, elements (e.g., network devices) of access network 6 to provide packet transport between subscriber devices 16 and network device 18A. Access network 6 represents a network that aggregates data traffic from one or more of subscriber devices 16 for transport to/from WAN 7 of the service provider. Access network 6 includes network nodes that execute communication protocols to transport control and user data to facilitate communication between subscriber devices 16 and network device 18A. Access network 6 may include a broadband access network, a wireless LAN, a public switched telephone network (PSTN), a customer premises equipment (CPE) network, or other type of access network, and may include or otherwise provide connectivity for cellular access networks, such as a radio access network (RAN), e.g., RAN 4. Examples of the RAN include networks conforming to a $5^{th}$ Generation (5G) mobile network, $4^{th}$ Generation (4G) mobile network Universal Mobile Telecommunications System (UMTS) architecture, an evolution of UMTS referred to as Long Term Evolution (LTE), mobile IP standardized by the Internet Engineering Task Force (IETF), as well as other standards proposed by the $3^{rd}$ Generation Partnership Project (3GPP), $3^{rd}$ Generation Partnership Project 2 (3GGP/2) and the WiMAX forum.

Network device 18A-18B (collectively, "network devices 18") may each be a customer edge (CE) router, a provider edge (PE) router, or other network device that provides connectivity between networks, e.g., access network 6 and public network 12. WAN 7 offers packet-based connectivity to subscriber devices 16 attached to access network 6 for accessing public network 12 (e.g., the Internet). WAN 7 may represent a public network that is owned and operated by a service provider to interconnect a plurality of networks, which may include access network 6. In some examples, WAN 7 may implement Multi-Protocol Label Switching (MPLS) forwarding and in such instances may be referred to as an MPLS network or MPLS backbone. In some instances, WAN 7 represents a plurality of interconnected autonomous systems, such as the Internet, that offers services from one or more service providers. Public network 12 may represent the Internet. Public network 12 may represent an edge network coupled to WAN 7 via a transit network 22 and one or more network devices, e.g., a customer edge device such as customer edge switch or router. Public network 12 may include a data center. In the example of FIG. 1, network device 18B may exchange packets with service nodes 10 via virtual network 20, and network device 18B may forward packets to public network 12 via transit network 22.

In examples of network system 2 that include a wireline/broadband access network, network devices 18A or 18B may represent a Broadband Network Gateway (BNG), Broadband Remote Access Server (BRAS), MPLS PE router, core router or gateway, or Cable Modem Termination System (CMTS). In examples of network system 2 that include a cellular access network as access network 6, network devices 18A or 18B may represent a mobile gateway, for example, a Gateway General Packet Radio Service (GPRS) Serving Node (GGSN), an Access Gateway (aGW), or a Packet Data Network (PDN) Gateway (PGW). In other examples, the functionality described with respect to network device 18B may be implemented in a switch, service card or another network element or component. In some examples, network device 18B may itself be a service node.

A network service provider that administers at least parts of network system 2 typically offers services to subscribers associated with devices, e.g., subscriber devices 16, that access network system 2. Services offered may include, for example, traditional Internet access, VoIP, video and multimedia services, and security services. As described above with respect to WAN 7, WAN 7 may support multiple types of access network infrastructures that connect to service provider network access gateways to provide access to the offered services, e.g., service provided by service node 10. In some instances, the network system may include subscriber devices 16 that attach to multiple different access networks 6 having varying architectures.

In general, any one or more of subscriber devices 16 may request authorization and data services by sending a session request to a gateway device such as network devices 18A or 18B. In turn, the network device may access a central server (not shown) such as an Authentication, Authorization and Accounting (AAA) server to authenticate the one of subscriber devices 16 requesting network access. Once authenticated, any of subscriber devices 16 may send subscriber data traffic toward WAN 7 to access and receive services provided by public network 20, and such packets may traverse network devices 18A or 18B as part of at least one packet flow. In some examples, network device 18A may forward all authenticated subscriber traffic to public network 12, and network device 18B may apply services and/or steer particular subscriber traffic to data center 9 if the subscriber traffic requires services on service nodes 10. Applications (e.g., service applications) to be applied to the subscriber traffic may be hosted on service nodes 10.

For example, network system 2 includes a data center 9 having a cluster of service nodes 10 that provide an execution environment for the virtualized network services. In some examples, each of service nodes 10 represents a service instance. Each of service nodes 10 may apply one or more services to traffic flows. As such, network device 18B may steer subscriber packet flows through defined sets of services provided by service nodes 10. That is, in some examples, each subscriber packet flow may be forwarded through a particular ordered combination of services provided by services nodes 10, each ordered set being referred to herein as a "service chain." As examples, service nodes 10 may apply stateful firewall (SFW) and security services, deep packet inspection (DPI), carrier grade network address translation (CGNAT), traffic destination function (TDF) services, media (voice/video) optimization, Internet Protocol security (IPSec)/virtual private network (VPN) services, hypertext transfer protocol (HTTP) filtering, counting, accounting, charging, and/or load balancing of packet flows, or other types of services applied to network traffic.

In some examples, network system 2 comprises a software defined network (SDN) and network functions virtualization (NFV) architecture. In these examples, an SDN controller (not shown) may provide a controller for configuring and managing the routing and switching infrastructure of network system 2.

Although illustrated as part of data center 9, service nodes 10 may be network devices coupled by one or more switches or virtual switches of WAN 7. In one example, each of services nodes 10 may run as virtual machines (VMs) in a virtual compute environment. Moreover, the compute environment may comprise a scalable cluster of general computing devices, such as x86 processor-based services. As another example, service nodes 10 may comprise a combination of general purpose computing devices and special purpose appliances. As virtualized network services, individual network services provided by service nodes 10 can scale just as in a modern data center through the allocation of virtualized memory, processor utilization, storage and network policies, as well as horizontally by adding additional load-balanced VMs. In other examples, services nodes 10 may be gateway devices or other routers. In further examples, the functionality described with respect to each of service nodes 10 may be implemented in a switch, service card, or another network element or component.

As described herein, network elements within network system 2 may provide network monitoring services. For example, network devices 18 and/or service nodes 10 are configured as measurement points (e.g., test agents) to provide network monitoring services to determine, for example, performance and functionality, as well as interconnections of service chains. Test agents may be delivered from a cloud as a Software-as-a-Service (SaaS) solution or deployed on premise in NFV environments. Network elements configured with test agents may send and/or receive test packets to compute one or more key performance indicators (KPIs) of the network, such as latency, delay (inter frame gap), jitter, packet loss, throughput, and the like. Test agents may send test packets in accordance with various protocols, such as Hypertext Transfer Protocol (HTTP), Internet Control Message Protocol (ICMP), Speedtest, User Datagram Protocol (UDP), Transmission Control Protocol (TCP), Operations, Administration and Maintenance (OAM) functions (e.g., Y.1731), Two-Way Active Measurement Protocol (TWAMP), Internet Protocol television (IPTV) and Over the Top (OTT) protocol, VoIP telephony and Session Initiation Protocol (SIP), mobile radio, remote packet inspection, and other protocols to measure network performance.

In the example of FIG. 1, network device 18A is configured with test agent 19A, network device 18B is configured with test agent 19B, service node 10A is configured with test agent 19C, service node 10B is configured with test agent 19D, service node 10C is configured with test agent 19E, and service node 10D is configured with test agent 19F. Although each of network devices 18 and service nodes 10 are described as being configured with a test agent, any number of network devices and/or service nodes may be configured with test agents to provide monitoring services.

To test the network performance between network device 18A and service node 10A, for example, test agent 19A of network device 18A may send a test packet to test agent 19C of service node 10A. The test packet may include a timestamp that indicates the time at which the test packet is sent. The timestamp sent by network device 18A may be referred to herein as "sending timestamp." Test agent 19C of service node 10A may receive the test packet including the sending timestamp and generate a timestamp that indicates the time at which the test packet is received. The timestamp generated by test agent 19C of service node 10A may be referred to herein as "receiving timestamp." Test agent 19C of service node 10A may use the sending timestamp and the receiving timestamp to compute one or more KPIs. For example, test agent 19C of service node 10A may determine the latency between network device 18A and service node 10A based on the difference between the receiving timestamp and the sending timestamp. Test agent 19C of service node 10A sends the one or more KPI measurements (illustrated in FIG. 1 as KPI measurements 24) to controller 14, which in turn may present, e.g., via a graphical user interface, the one or more KPI measurements to a user and/or network administrator. In this way, devices configured with the test agents may measure the network performance between the sender device and the receiver device with a unidirectional test packet.

In some instances, network device 18A (e.g., sender device) may experience issues with sending the test packet, which may result in inaccurate KPI measurements by the receiver device (e.g., service node 10A). As one example, a test application for test agent 19A configured on network device 18A may generate a sending timestamp and forward the sending timestamp to its network interface (e.g., network interface card (NIC) such as an Ethernet card) to send the test packet to service node 10A. The network interface of network device 18A may, in some instances, experience delay in sending the timestamp to service node 10A (referred to herein as "sender delay"). Service node 10A (e.g., receiver device) may receive the test packet after the sender delay, generate a receiving timestamp to indicate the time at which the test packet was received, and compute one or more KPI measurements (e.g., latency) based on the sending timestamp and receiving timestamp without accounting for the sender delay. Service node 10A may send the latency measurement to controller 14, which presents the latency measurement, e.g., via a graphical user interface, to a user or network administrator. In these examples, the user or network administrator may incorrectly attribute the latency issue to the network between network device 18A and service node 10A if there is no indication that the latency measurement is inaccurate and/or untrustworthy, which may lead to unnecessary troubleshooting and corrective measures.

In some examples, there may be a pause in the sender device carrying out the measurement process, for example, due to the device serving other processes. For example, network device 18A may experience a pause in sending the test packet as other applications executing on network device 18A may require CPU cycles. When the network monitoring services are resumed, network device 18A may typically send test packets in a burst to maintain a certain average Packet Per Second rate. This may cause test packet losses in network device 18A due to queue overflows.

In accordance with the techniques described in this disclosure, network system 2 may provide detection of network measurement inaccuracies. For example, network device 18A may detect the sender delays or packet drops, and notify the controller 14 that the one or more KPI measurements based on the test packet sent from network device 18A are inaccurate and/or untrustworthy.

In one example, network device 18A may detect a delay in outputting the test packet from the network device 18A. As further described in FIG. 2 below, a test application of network device 18A may generate a test packet including a first timestamp (also referred to herein as "application sending timestamp") that indicates a time at which the test packet is generated by the test application. Network device 18A may obtain a second timestamp generated by a network interface of network device 18A that indicates a time at which the test packet is output from network device 18A (also referred to herein as "actual sending timestamp"). Network device 18A may compute a time difference value between the first timestamp (actual sending timestamp) and the second timestamp (application sending timestamp), and compare the time difference value with a threshold time value. If network device 18A detects a delay in outputting the test packet from network device 18A to service node 10A, e.g., based on the evaluation of the time difference value and the threshold time value, network device 18A sends a message 26 to controller 14 to notify controller 14 that network device 18A has detected issues in sending the test packet (e.g., sender delay). In some examples, network device 18A may send message 26 including additional information associated with the sender delay, such as the delay value. In some examples, network device 18A may send the message 26 after a defined measurement interval in which a plurality of test packets were delayed during a defined time interval.

In response to receiving message 26 from network device 18A, controller 14 may, in some examples, generate a visual indication within the graphical user interface that the one or more KPI measurements 24 are inaccurate and/or untrustworthy. In other examples, controller 14 may remove the one or more KPI measurements 24. In some examples, controller 14 may adjust the one or more KPI measurements 24 based on additional information included in message 26 (e.g., delay value).

In another example, network device 18A may detect packet drops (e.g., due to scheduling pauses) when sending test packets to service node 10A. As further described in FIG. 3 below, network device 18A may compare a count of test packets sent by the network interface (e.g., hardware of the network interface) with a count of test packets sent from the test application (e.g., whether the number of test packets sent by the network interface is less than the number of test packets sent from the test application). Based on the comparison, network device 18A may send a message 26 to controller 14 to notify controller 14 that network device 18A has detected issues in sending the test packet (e.g., dropped test packets). In some examples, network device 18A may send message 26 including additional information associated with the detected issues, such as the number of sent or dropped packets.

In response to receiving message 26 from network device 18A, controller 14 may, in some examples, generate a visual indication within the graphical user interface that the one or more KPI measurements 24 are inaccurate and/or untrustworthy. In other examples, controller 14 may remove the one or more KPI measurements 24. In some examples, controller 14 may adjust the one or more KPI measurements 24 based on additional information included in message 26 (e.g., number of sent or dropped packets).

Although described for purposes of example with respect to a SD-WAN context in FIG. 1, the techniques of the disclosure can be applied in any WAN assurance or network assurance context.

Figure 2:
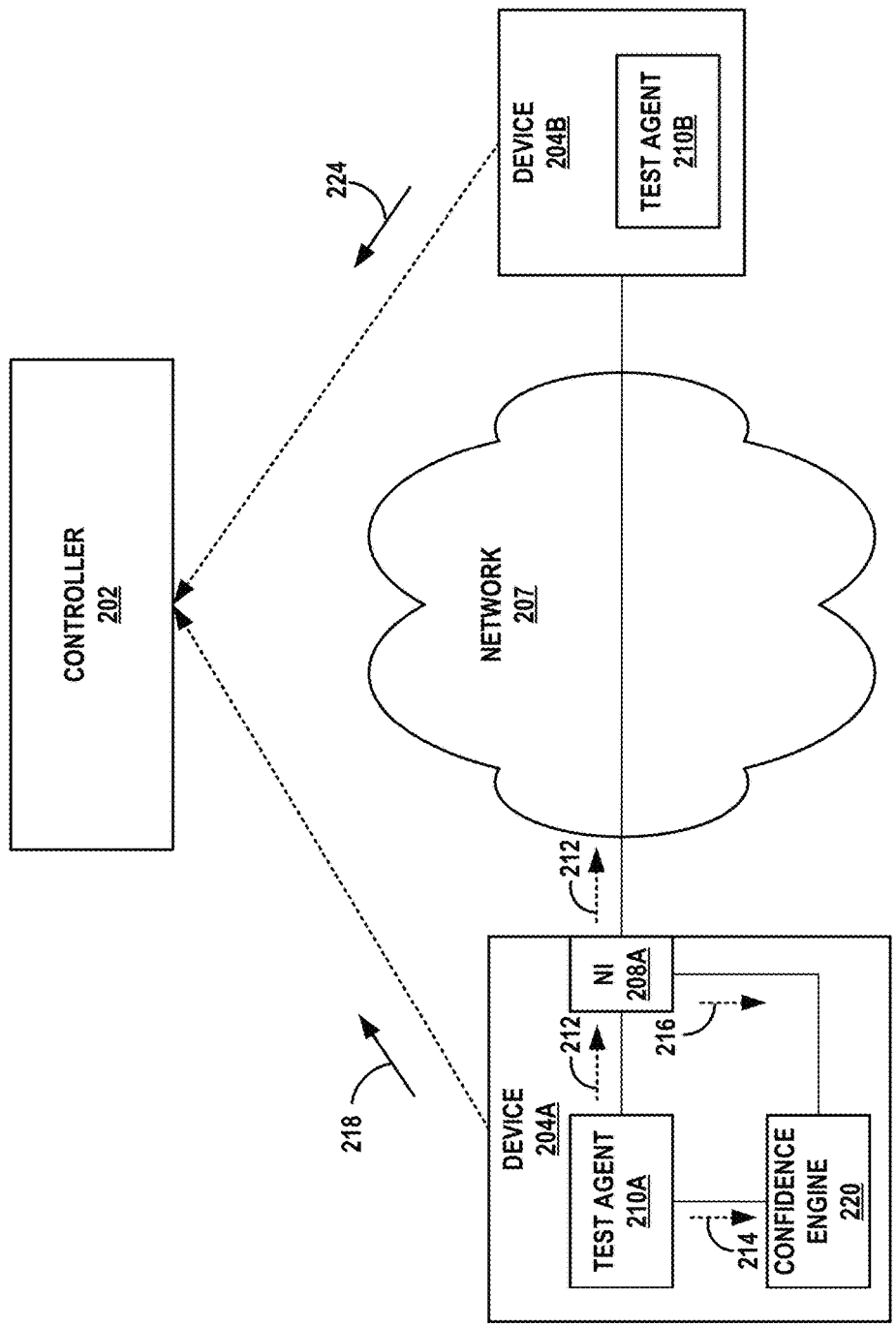
FIG. 2 is a block diagram illustrating an example network system that provides detection of network measurement inaccuracies through the detection of sender delays, in accordance with one or more aspects of the techniques described in this disclosure.

FIG. 2 is a block diagram illustrating an example of a network system that provides detection of network measurement inaccuracies through the detection of sender delays, in accordance with one or more aspects of the techniques described in this disclosure. In the example of FIG. 2, controller 202 may represent an example of controller 14 of FIG. 1, and devices 204A-204B may represent any of network devices 18, service nodes 10 of FIG. 1, or any network element configured as measurement points to measure network performance. Network 207 may represent WAN 7 of FIG. 1, and/or other networks connecting at least two network elements configured as measurement points.

In this example, device 204A may include a confidence engine 220 to detect sender inaccuracies due to sender delay. As one example, a test application for test agent 210A of device 204A may generate a test packet 212 including a first timestamp 214 (application sending timestamp) at the application layer of the Open Systems Interconnection (OSI) model. In response to the generation of test packet 212, test agent 210A forwards test packet 212 to network interface 208A (illustrated in FIG. 2 as "NI 208A") to output the test packet to device 204B at the data link layer or layer 2 of the OSI model. Network interface 208A outputs test packet 212 to device 204B and generates a second timestamp 216 (actual sending timestamp) indicating the time at which test packet 212 is output from network interface 208A. Confidence engine 220 of device 204A obtains the first timestamp 214 from the test application and the second timestamp 216 from network interface 208A (e.g., from the kernel or hardware of the network interface).

Confidence engine 220 of device 204A may compare the first timestamp 214 and the second timestamp 216 to determine whether to notify controller 202 that one or more KPI measurements based on the test packet sent by device 204A are inaccurate and/or untrustworthy. For example, confidence engine 220 of device 204A may compute the time difference value between the second timestamp 216 and the first timestamp 214, and evaluate the time difference value with a threshold time value. For example, a user or network administrator may define a delay value (e.g., in milliseconds) that controls whether device 204A is to notify controller 202 of the sender delay. In some examples, confidence engine 220 may compute a plurality of time difference values between a plurality of actual sending timestamps and a plurality of application sending timestamps and dynamically adjust the threshold based on an evaluation of the plurality of time difference values. If the time difference value exceeds the threshold time value (e.g., time difference value is larger than the threshold time value), device 204A sends a message 218 to controller 202 to notify controller 202 that the one or more KPI measurements based on test packet 212 sent by device 204A are inaccurate and/or untrustworthy. In some examples, message 218 may include a flag or any type of notification to indicate an existence of sender delay in sending the test packet, the time difference value, and/or other information about the sender delay. In some examples, device 204A may send messages using NETCONF or other messaging protocols.

Controller 202 may receive message 218 from device 204A and receive one or more KPI measurements 224 from device 204B. The one or more KPI measurements 224 are computed with the application sending timestamp 214 included in test packet 212 and a receiving timestamp generated by device 204B in response to receiving test packet 212. In response to receiving message 218, controller 202 may, in some examples, generate a visual indication (e.g., warning symbol, highlight the measurement in a particular color, etc.) that the one or more KPI measurements 224 are inaccurate and/or untrustworthy. In another example, controller 202 may remove the one or more KPI measurements 224 in response to receiving message 218. In another example, controller 202 may receive a delta value included in message 218 and use the delta value to adjust the one or more KPI measurements 224. For example, device 204A may compute a plurality of deltas from a plurality of application sending timestamps and a plurality of actual sending timestamps, and determine from the plurality of deltas that the device 204A is consistently experiencing a delay (e.g., average of 0.1 millisecond) when sending test packets. Device 204A may, in this example, send the delay value to controller 202 such that controller 202 may adjust the one or more KPI measurements based on the delay value.

Figure 3:
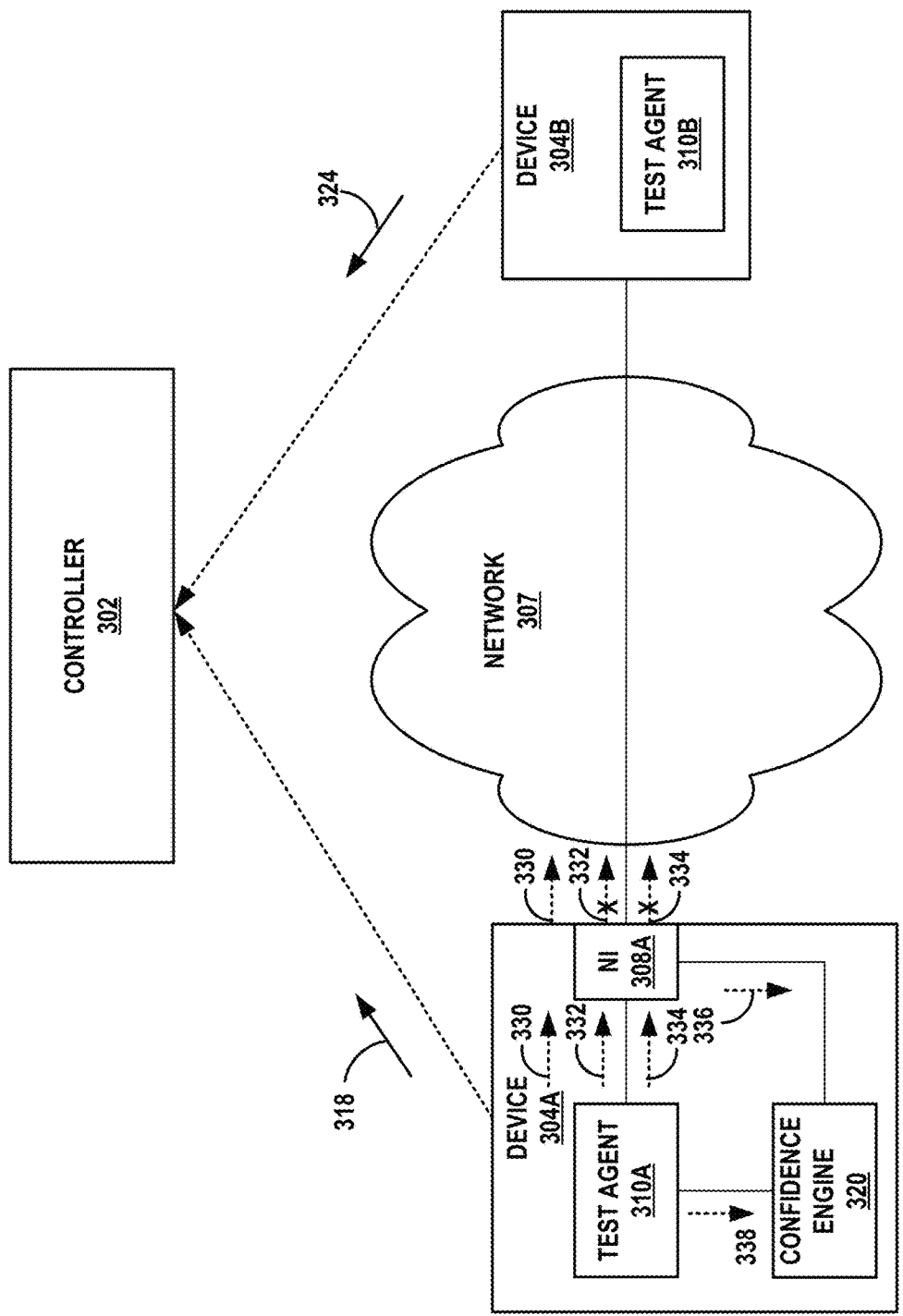
FIG. 3 is a block diagram illustrating an example network system that provides detection of network measurement inaccuracies through the detection of sender packet drops, in accordance with one or more aspects of the techniques described in this disclosure.

FIG. 3 is a block diagram illustrating an example of a network system that provides detection of network measurement inaccuracies through the detection of sender packet drops, in accordance with one or more aspects of the techniques described in this disclosure. In the example of FIG. 3, controller 302 may represent an example of controller 14 of FIG. 1, and devices 304A-304B may represent any of network devices 18, service nodes 10 of FIG. 1, or any network element configured as measurement points to measure network performance. Network 307 may represent WAN 7 of FIG. 1, or other network connecting at least two network elements configures as measurement points.

In this example, device 304A may include a confidence engine 320 to detect sender inaccuracies due to sender packet drops. As one example, a test application for test agent 310A of device 304A may generate test packets 330, 332, and 334. Due to a pause in the network measurement process, device 304A may store the test packets in a process scheduling queue until the measurement process is resumed. When the measurement process is resumed, device 304A may drop test packets 332 and 334 due to queue overflows, for example. To detect sender inaccuracies due to the sender packet drops, confidence engine 320 may obtain from network interface 308A (illustrated in FIG. 3 as "NI 308A") a count 336 of the number of test packets sent and/or dropped from the network interface. In this example, confidence engine 320 may obtain a count of one test packet sent (e.g., test packet 330) and/or a count of two test packets dropped (e.g., test packets 332 and 334). Confidence engine 320 may also obtain from test agent 310A the count of test packets sent by the test application. In this example, confidence engine 320 obtains a count of three test packets sent by the test application.

Confidence engine 320 of device 304A may compare the number of test packets sent by network interface 308A with the number of test packets sent from the test application, and send controller 302 a message to notify the controller the result of that comparison. For example, if the number of test packets sent by network interface 308A is less than the number of packets sent from the test application, confidence engine 320 may send a message 318 to controller 302 to notify controller 302 that the one or more KPI measurements based on the test packets from device 304A are inaccurate and/or untrustworthy. In some examples, confidence engine 320 of device 304A may send a message indicating that the count of packets sent from the network interface is less than the count of the test packets sent by the application, and controller 302 may determine that the one or more KPI measurements based on the test packets from device 304A are inaccurate and/or untrustworthy.

Alternatively, or additionally, if the number of test packets sent by network interface 308A is greater than the number of test packets sent from the test application (e.g., if packets are sent from other applications and processes on the shared system), and drops are still detected on the network interface counter, confidence engine 320 may send a message 318 to controller 302 to notify controller 302 that the one or more KPI measurements based on the test packets from device 304A may be inaccurate and/or may be untrustworthy. In some examples, confidence engine 320 of device 304A may send a message indicating that the count of packets sent from the network interface is greater than the count of the test packets sent by the application, and controller 302 may determine that the one or more KPI measurements based on the test packets from device 304A may be inaccurate and/or untrustworthy.

In this example, confidence engine 320 determines that the number of test packets sent by network interface 308A (e.g., one) is less the number of test packets sent from the test application (e.g., three). In response, sends message 318 including a flag or any type of notification to indicate the existence of a sender issue due to sender packet drops, the number of sent or dropped packets, and/or other information about the sender issue due to sender packet drops. In some examples, device 304A may send messages using NETCONF or other messaging protocols.

Controller 302 may receive message 318 from device 304A and receive the one or more KPI measurements 324 from device 304B. The one or more KPI measurements 324 are computed with test packet 330. Controller 302 may, in some examples, generate a visual indication (e.g., warning symbol, highlight the measurement in a particular color, etc.) that the one or more KPI measurements 324 are (or may be) inaccurate and/or untrustworthy. In another example, controller 302 may remove the one or more KPI measurements 324 in response to receiving message 318. In another example, controller 302 may receive the number of sent or dropped packets included in message 318 and use the number of sent or dropped packets to adjust the one or more KPI measurements 324.

Figure 4:
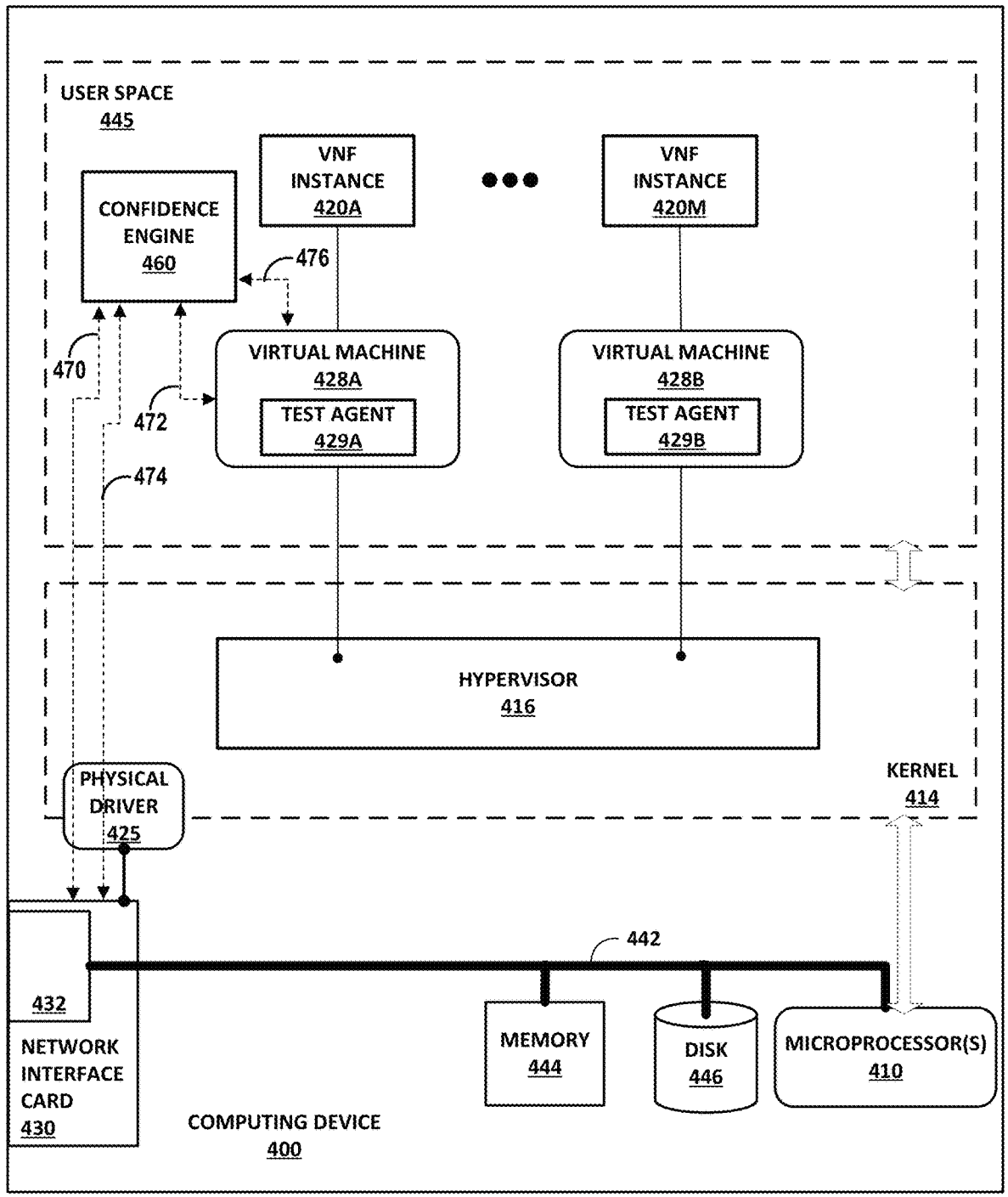
FIG. 4 is a block diagram illustrating an example computing device to execute one or more functions to perform the detection of network measurement inaccuracies, in accordance with the techniques described in this disclosure.

FIG. 4 is a block diagram illustrating an example computing device that includes a confidence engine for detecting sender inaccuracies, in accordance with the techniques described in this disclosure. Computing device 400 of FIG. 4 may represent any of network devices 18 and/or a server hosting service nodes 10 of FIG. 1, devices 204 of FIG. 2, and/or devices 304 of FIG. 3. Computing device 400 includes in this example, a bus 442 coupling hardware components of a computing device 400 hardware environment. Bus 442 couples network interface card (NIC) 430, storage disk 446, and one or more microprocessors 410 (hereinafter, "microprocessor 410"). NIC 430 may be SR-IOV-capable. A front-side bus may in some cases couple microprocessor 410 and memory device 444. In some examples, bus 442 may couple memory device 444, microprocessor 410, and NIC 430. Bus 442 may represent a Peripheral Component Interface (PCI) express (PCIe) bus. In some examples, a direct memory access (DMA) controller may control DMA transfers among components coupled to bus 442. In some examples, components coupled to bus 442 control DMA transfers among components coupled to bus 442.

Microprocessor 410 may include one or more processors each including an independent execution unit to perform instructions that conform to an instruction set architecture, the instructions stored to storage media. Execution units may be implemented as separate integrated circuits (ICs) or may be combined within one or more multi-core processors (or "many-core" processors) that are each implemented using a single IC (i.e., a chip multiprocessor).

Disk 446 represents computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, Flash memory, CD-ROM, digital versatile discs (DVD) or other optical storage, magnetic cassettes, magnetic tape, magnetic disk storage or other magnetic storage devices, or any other medium that can be used to store the desired information and that can be accessed by microprocessor 410.

Main memory 444 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Main memory 444 provides a physical address space composed of addressable memory locations.

Network interface card (NIC) 430 includes one or more interfaces 432 configured to exchange packets using links of an underlying physical network. Interfaces 432 may include a port interface card having one or more network ports. NIC 430 may also include an on-card memory to, e.g., store packet data, timestamps, counters of sent and/or dropped packets. Direct memory access transfers between the NIC 430 and other devices coupled to bus 442 may read/write from/to the NIC memory.

Memory 444, NIC 430, storage disk 446, and microprocessor 410 may provide an operating environment for a software stack that includes an operating system kernel 414 executing in kernel space. Kernel 414 may represent, for example, a Linux, Berkeley Software Distribution (BSD), another Unix-variant kernel, or a Windows server operating system kernel, available from Microsoft Corp. In some instances, the operating system may execute a hypervisor 416 and one or more virtual execution elements, e.g., virtual machines 428A-428B (collectively, "virtual machines 428"), managed by hypervisor 416. While illustrated and described with respect to virtual machines, VNF instances 420A-420M (collectively, "VNF instances 420") may be executed by other operating environments, such as containers (e.g., a DOCKER container). Additional examples of monitoring services provided by virtual execution elements is described in U.S. Provisional Patent Application 63/114,444, entitled "Active Assurance for Virtualized Services," filed Nov. 16, 2020, the entire contents of which is incorporated by reference herein.

Computing device 400 executes hypervisor 416 to manage virtual machines 428. Example hypervisors include Kernel-based Virtual Machine (KVM) for the Linux kernel, Xen, ESXi available from VMware, Windows Hyper-V available from Microsoft, and other open-source and proprietary hypervisors. The term hypervisor can encompass a virtual machine manager (VMM). An operating system that includes kernel 414 provides an execution environment for one or more processes in user space 445 (e.g., test agent application, as described in this disclosure).

Virtual machines 428 host corresponding VNF instances 420. In some examples, a virtual machine 428 may host one or more VNF instances 420. Each of VNF instances 420 is configured to apply a network function to packets. In this example, VNF instance 420 is configured to host a test agent, e.g., test agents 429A-429B (collectively, "test agents 429").

Kernel 414 includes a physical driver 425 to use the network interface card 430. Network interface card 430 may also implement SR-IOV to enable sharing the physical network function (I/O) among one or more virtual execution elements, such virtual machines 428 and/or containers (not shown in FIG. 4). Shared virtual devices such as virtual functions may provide dedicated resources such that each of the virtual execution elements may access dedicated resources of NIC 430, which therefore appears to each of the virtual execution elements as a dedicated NIC. Virtual functions may represent lightweight PCIe functions that share physical resources with a physical function used by physical driver 425 and with other virtual functions. For an SR-IOV-capable NIC 430, NIC 430 may have thousands of available virtual functions according to the SR-IOV standard, but for I/O-intensive applications the number of configured virtual functions is typically much smaller.

Test agents 429 may communicate with other test agents using various protocols to measure internet performance and/or network performance. For example, protocols to measure internet performance may include Hypertext Transfer Protocol (HTTP), Internet Control Message Protocol (ICMP), and/or Speedtest. Protocols to measure network performance may include User Datagram Protocol (UDP), Transmission Control Protocol (TCP), Operations, Administration and Maintenance (OAM) functions (e.g., Y.1731), Two-Way Active Measurement Protocol (TWAMP), Internet Protocol television (IPTV) and Over the Top (OTT) protocol, VoIP telephony and Session Initiation Protocol (SIP), mobile radio, remote packet inspection, and other protocols to measure network performance. Test agents 429 may use messaging protocols, such as Network Configuration Protocol (NETCONF), to communicate with a controller (e.g., controller 14 of FIG. 1, controller 202 of FIG. 2 or controller 302 of FIG. 3).

In accordance with the techniques described herein, computing device 400 may include a confidence engine 460 for detecting network measurement inaccuracies through the detection of sender delays or packet drops. Confidence engine 460 may include code executable by microprocessor 410. Confidence engine 460 may be one or more computer processes in user space 445.

Computing device 400 may receive, via a management interface, e.g., a command line interface (CLI) or graphical user interface (GUI) (not shown in FIG. 4), a command enabling a sender inaccuracy notification mode to perform the techniques described in this disclosure. As one example, confidence engine 460 is configured to detect sender inaccuracies due to sender delays. For example, confidence engine 460 may obtain a first timestamp 472 (e.g., application sending timestamp 214 of FIG. 2) from the test application for test agent 429A that indicates the time at which a test packet is generated by the test application. NIC 430 may each include a hardware clock and may generate a timestamp that indicates the time at which a test packet is output from the NIC 430 and store the timestamp in a memory of the NIC. Confidence engine 460 is also configured to obtain a second timestamp 470 from NIC 430 (e.g., actual sending timestamp 216 of FIG. 2). For example, confidence engine 460 may use kernel 414 of computing device 400 to perform a system call to physical driver 425 to obtain timestamp 470 from the hardware of NIC 430. In some examples, confidence engine 460 may obtain an actual sending timestamp from one or more virtual network interfaces that perform packet I/O or otherwise process a packet. For example, computing device 400 may use a virtual hardware component (e.g., an SR-My virtual function) enabled by NIC 430 to perform packet I/O and receive/send packets. In these examples, confidence engine 460 may obtain the actual sending timestamp from the packet I/O component.

Confidence engine 460 is also configured to compare the first timestamp 472 (application sending timestamp) and the second timestamp 470 (actual sending timestamp) to determine whether to notify a controller (e.g., controller 202 of FIG. 2) that one or more KPI measurements based on the test packet sent by device 400 are inaccurate and/or untrustworthy. For example, confidence engine 460 is configured to compute a time difference value between the second timestamp 470 and the first timestamp 472, and evaluate the time difference value with a threshold time value. Computing device 400 may include a management interface, to receive an input from a user or network administrator to specify the threshold time value and computing device 400 may store the threshold time value. If the time difference value exceeds the threshold time value (e.g., time difference value is larger than the threshold time value), confidence engine 460 is configured to generate a message (e.g., message 218 of FIG. 2) to notify the controller that the one or more KPI measurements based on the test packet sent by computing device 400 are inaccurate and/or untrustworthy. For example, confidence engine 460 may use, e.g., NETCONF, to generate a message including a flag or any type of notification to indicate the existence of sender delay, the time difference value, and/or other information about the sender delay.

As another example, confidence engine 460 is configured to detect sender inaccuracies due to packet drops. For example, NIC 430 may each include a counter to count the number of packets sent or dropped and store the count in a memory of the IFC. Confidence engine 460 is configured to obtain the count of packets sent or dropped from NIC 430 (e.g., count 336 of FIG. 3). For example, confidence engine 460 may use kernel 414 of computing device 400 to perform a system call to physical driver 425 to obtain the count 474 from NIC 430. Confidence engine 460 may also obtain the count 476 of test packets sent from the test application (e.g., count 338 of FIG. 3).

Confidence engine 460 is also configured to compare the count 474 of packets sent or dropped by NIC 430 and the count 476 of test packets sent from the test application. For example, confidence engine 460 is configured to determine if the number of test packets sent by NIC 430 is less than the number of packets sent from the test application. If the number of test packets sent by NIC 430 is less than the number of packets sent from the test application, confidence engine 460 is configured to generate a message (e.g., message 318 of FIG. 3) to notify the controller that the one or more KPI measurements based on the test packet sent by computing device 400 are inaccurate and/or untrustworthy. For example, confidence engine 460 may use, e.g., NETCONF, to generate a message including a flag or any type of notification to indicate the existence of a sender issue due to packet drops, the number of sent or dropped packets, and/or other information about the sender issue due to packet drops.

A user or administrator may enable (or disable) a sender inaccuracy notification mode to notify the controller of sender inaccuracies due to sender delays, to notify the controller of sender inaccuracies due to sender packet drops, or both.

In this way, computing device 400 may detect any sender inaccuracies due to sender delay or packet drops, and notify the controller of the sender inaccuracies, such that the controller may generate a visual indication (e.g., warning symbol, highlight the measurement in a particular color, etc.) that the one or more KPI measurements are (or may be) inaccurate and/or untrustworthy, or adjust the one or more KPI measurements based on information received from the notification message.

Figure 5:
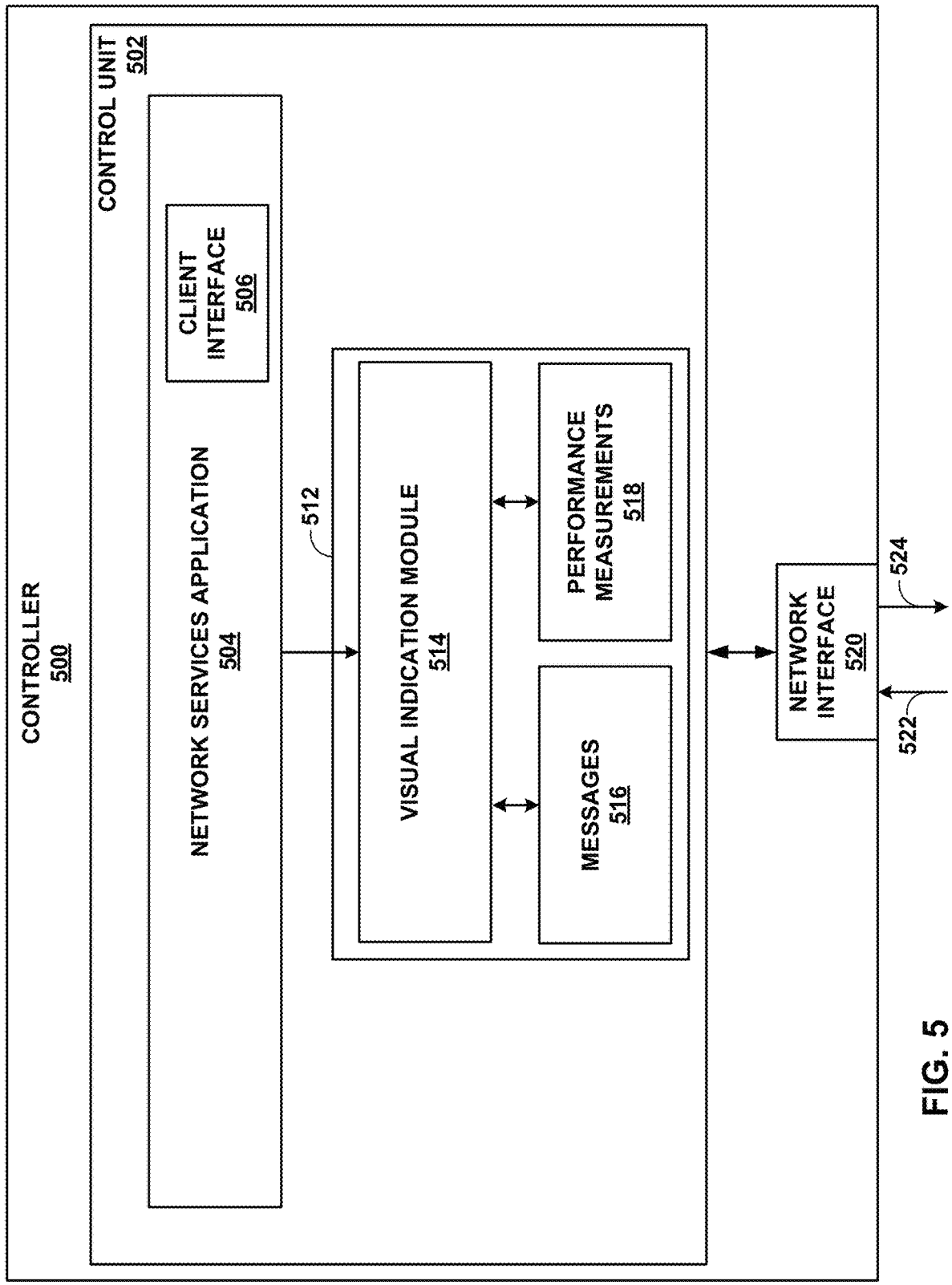
FIG. 5 is a block diagram illustrating an example of a controller capable of operating in accordance with the techniques described in this disclosure.

FIG. 5 is a block diagram illustrating an example of a controller capable of operating in accordance with the techniques described in this disclosure. Controller 500 may include a server or network controller, for example, and may represent an example instance of controller 14 of FIG. 1, controller 202 of FIG. 2, and controller 302 of FIG. 3.

In the example of FIG. 5, controller 500 includes a control unit 502 coupled to a network interface 520 to exchange packets with other network devices by inbound link 522 and outbound link 524. Control unit 502 may include one or more processors (not shown in FIG. 5) that execute software instructions, such as those used to define a software or computer program, stored to a computer-readable mediums including a storage device (e.g., a disk drive, or an optical drive) or a memory (such as Flash memory or random access memory (RAM)) or any other type of volatile or non-volatile memory, that stores instructions to cause the one or more processors to perform the techniques described herein. Alternatively, or additionally, control unit 202 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Control unit 502 provides an operating environment for network services applications 504 and network measurement module 512. In one example, these modules may be implemented as one or more processes executing on one or more virtual machines of one or more servers. That is, while generally illustrated and described as executing on a single controller 500, aspects of these modules may be delegated to other computing devices.

Network services applications 504 represent one or more processes that provide services to clients of the network that includes controller 500 to provide a visualization of network performance measurements computed from test packets exchanged by test agents within the network. Network services applications 504 provide services such as performance measurement visualization, session management to test agents, etc. Each of network services applications 504 may include client interface 506 by which one or more client applications request services. Client interface 506 may represent a command line interface (CLI) or graphical user interface (GUI), for instance. Client interface 506 may also, or alternatively, provide an application programming interface (API) such as a web service to client applications. A user or administrator may enable (or disable) a sender inaccuracy notification mode, via client interface 506, to notify the controller of sender inaccuracies due to sender delays, to notify the controller of sender inaccuracies due to sender packet drops, or both.

Network services applications 504 issue requests to visualize network performance measurements to network measurement module 512. Network measurement module 512 may generate visual indications, such as indications of performance measurements computed by a receiver test agent (e.g., test agent 210B of FIG. 2 or test agent 310B of FIG. 3). For example, controller 500 may establish a session (e.g., NETCONF) with the receiver test agent and receive one or more performance measurements from the test agent via inbound link 222. Controller 500 may store the one or more performance measurements in a performance measurement data store 518. Network measurement module 512 may output for display a visual indication of the one or more performance measurements stored in performance measurement data store 518.

Network measurement module 512 may, in some examples, receive a message from a sender test agent (e.g., test agent 210A of FIG. 2 or test agent 310A of FIG. 3) that notifies controller 500 that the one or more performance measurements are inaccurate. For example, controller 500 may establish a session (e.g., NETCONF) with the sender test agent and receive a message notifying controller 500 that one or more performance measurements computed based on test packets sent by the sender test agent are inaccurate. In some examples, network measurement module 512 may receive a message that includes a flag or any type of notification to indicate an existence of sender delay in sending the test packet, the time difference value, and/or other information about the sender delay.

Controller 500 may store the message in a messages data store 516. Network measurement module 512 may, in response to receiving the message, correlate the one or more performance measurements received from the receiver test agent with the messages in messages data store 516. For example, network measurement module 512 may determine the one or more performance measurements computed based on one or more test packets sent by the sender test agent and associate the message in messages data store 516 received from the sender test agent. Network measurement module 512 may output for display a visual indication of the one or more performance measurements and an indication that the one or more performance measurements are inaccurate. In some examples, network measurement module 512 may, in response to receiving the message, remove the one or more performance measurements computed based on the test packet sent by the sender test agent such that controller 500 does not output for display the one or more performance measurements to a user.

In some examples, network measurement module 512 may receive a message that notifies controller 500 of the result of a comparison performed by the sender device between the count of packets sent from the network interface of the sender device and the count of the one or more test packets sent by the application executed by the sender device. For example, network measurement module 512 may receive a message comprising an indication that the count of packets sent from the network interface of the sender device is less than the count of the one or more test packets sent by the application executed by the sender device. In this example, network measurement module 512 may determine, based on the indication that the count of packets sent from the network interface of the sender device is less than the count of the one or more test packets sent by the application executed by the sender device, that the one or more performance measurements received from the receiver test agent are inaccurate and/or untrustworthy. Network measurement module 512 may output for display a visual indication of the one or more performance measurements and an indication that the one or more performance measurements are inaccurate.

As another example, network measurement module 512 may receive a message comprising an indication that the count of packets sent from the network interface of the sender device is greater than the count of the one or more test packets sent by the application executed by the sender device. In this example, network measurement module 512 may determine, based on the indication that the count of packets sent from the network interface of the sender device is greater than the count of the one or more test packets sent by the application executed by the sender device, that the one or more performance measurements received from the receiver test agent may be inaccurate and/or untrustworthy. Network measurement module 512 may output for display a visual indication of the one or more performance measurements and an indication that the one or more performance measurements may be inaccurate.

Figure 6:
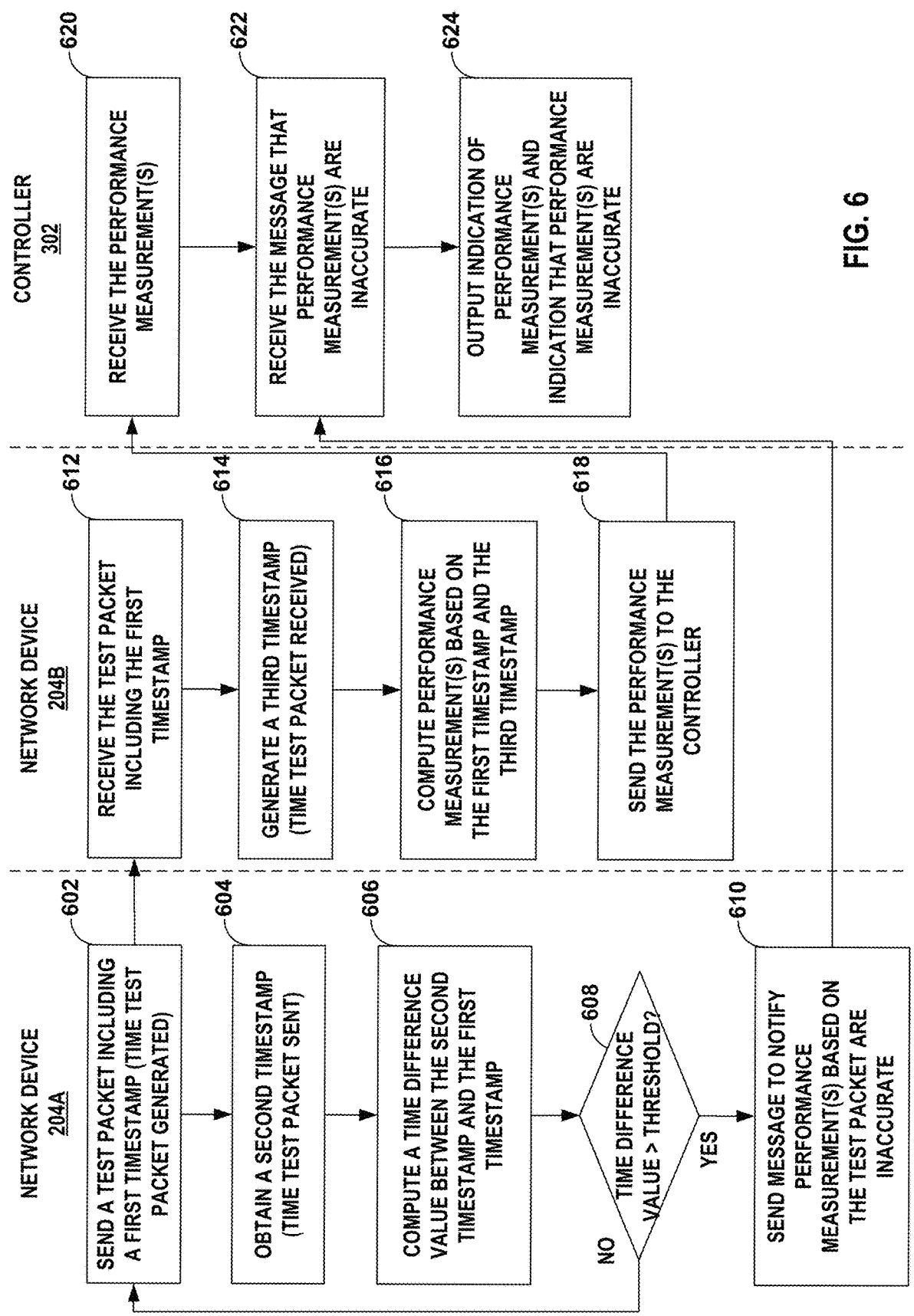
FIG. 6 is a flow diagram illustrating an example operation of detecting network measurement inaccuracies through the detection of sender delays, in accordance with one or more aspects of the techniques described in this disclosure.

FIG. 6 is a flow diagram illustrating an example operation of detecting network measurement inaccuracies through the detection of sender delays, in accordance with one or more aspects of the techniques described in this disclosure. For ease of illustration, the example operation is described with respect to device 204A of FIG. 2, controller 202 of FIG. 2, computing device 400 of FIG. 4, and controller 500 of FIG. 5, for example, but may represent any computing device and controller described in this disclosure. The following are steps of the process, although other examples of the process performed in the techniques of this disclosure may include additional steps or may not include some of the below-listed steps.

In the example of FIG. 6, device 204A sends a test packet 212 including a first timestamp 214 (application sending timestamp) to device 204B (602). The first timestamp 214 may indicate the time at which the test packet is generated by the test application. Device 204A obtains a second timestamp 216 (actual sending timestamp) that indicates the time at which test packet 212 is output from the network interface of device 204A (604). For example, device 204A may obtain the timestamp generated by the hardware of network interface 208A (e.g., via physical driver 425) when network interface 208A outputs test packet 212 to device 204B.

Device 204A computes a time difference value between the second timestamp 216 and the first timestamp 214 (606). Device 204A then compares the time difference value with a threshold time value (608). For example, a user or network administrator may use an interface (e.g., CLI or GUI) to define a time difference value (e.g., in milliseconds) that controls whether device 204A is to notify controller 202 of the sender delay. If the time difference value exceeds the threshold ("YES" of step 608), device 204A sends a message to controller 202 to notify the controller that one or more KPI measurements based on the test packet is inaccurate and/or untrustworthy. In some examples, the message may include a flag or any type of notification to indicate the existence of a sender delay in sending the test packet, the time difference value, and/or other information about the sender delay. In some examples, device 204A may send messages using NETCONF or other messaging protocols. If the time difference does not exceed the threshold ("NO" of step 608), device 204A does not send a message to controller 202 and may perform the process described in FIG. 6 for subsequent test packets.

A receiver test agent 210B of network device 204B may receive test packet 212 including the first timestamp 214 (612). Test agent 210B of network device 204B may generate a third timestamp (receiving timestamp) that indicates a time at which the test packet is received (614). Test agent 210B of network device 204B may compute one or more performance measurements based on the first timestamp (time test packet 212 was generated) and the third timestamp (time test packet 212 was received) (616). Test agent 210B of network device 204B sends the one or more performance measurements to controller 202 (618).

Controller 202 may receive the one or more performance measurements from receiver test agent 210B of network device 204B (620) and, in some examples, receive the message from sender test agent 210A of network device 204A that notifies controller 202 that the one or more performance measurements based on test packet 212 are inaccurate (622). In response to receiving the message notifying the controller that the one or more performance measurements are inaccurate, controller 202 outputs for display an indication of the one or more performance measurements and an indication that the one or more performance measurements are inaccurate (624). In some examples, controller 202 may remove the one or more performance measurements from being output for display.

Figure 7:
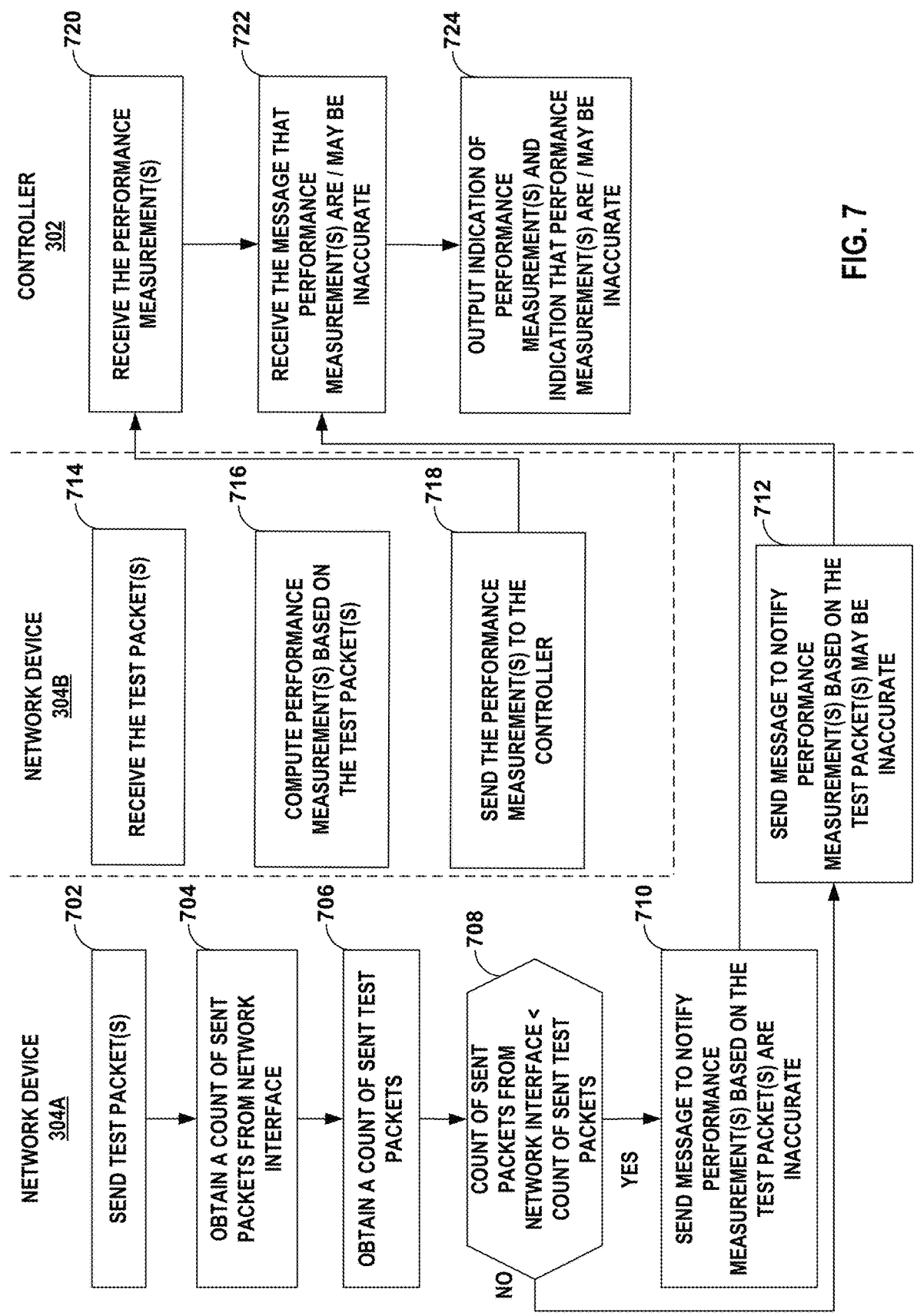
FIG. 7 is a flow diagram illustrating an example operation of detecting network measurement inaccuracies through the detection of sender packet drops, in accordance with one or more aspects of the techniques described in this disclosure.

FIG. 7 is a flow diagram illustrating an example operation of detecting network measurement inaccuracies through the detection of sender packet drops, in accordance with one or more aspects of the techniques described in this disclosure. The example operation is described with respect to device 304A of FIG. 3, controller 302 of FIG. 3, computing device 400 of FIG. 4, and controller 400 of FIG. 4, for example, but may represent any computing device and controller described in this disclosure. The following are steps of the process, although other examples of the process performed in the techniques of this disclosure may include additional steps or may not include some of the below-listed steps.

In the example of FIG. 7, device 304A sends one or more test packets, e.g., test packets 330, 332, and 334 to device 304B (702). Device 304A obtains a count of packets sent or dropped packets from network interface 308A (704). For example, a confidence engine of device 304A may obtain the count of sent or dropped packets generated by the hardware of network interface 308A (e.g., via physical driver 425) when network interface 308A sends packets out of the interface. Device 304A also obtains a count of packets sent from the test application (706).

Device 304A compares the count of sent packets from network interface 308A with the count of sent packets from the test application (708). If the count of sent packets from the network interface is less than the count of sent packets from the test application ("YES" of step 708), device 304A sends a message to controller 302 to notify the controller that the one or more KPI measurements based on the test packets sent by device 304A are inaccurate and/or untrustworthy. In some examples, confidence engine 320 of device 304A may send a message indicating the result of the comparison, e.g., that the count of packets sent from the network interface is less than the count of the test packets sent by the application, and controller 302 may determine that the one or more KPI measurements based on the test packets from device 304A are inaccurate and/or untrustworthy. In some examples, the message may include a flag or any type of notification to indicate the existence of sender packet drops in sending the test packets, the number of sent or dropped packets, and/or other information about the sender packet drops. In some examples, device 304A may send messages using NETCONF or other messaging protocols. If the count of sent packets from the network interface is greater than the count of sent packets from the test application and there are still drops detected on the interface counter ("NO" of step 708), device 304A sends a message to controller 302 to notify the controller that the one or more KPI measurements based on the test packets sent by device 304A may be inaccurate and/or untrustworthy (712). In some examples, confidence engine 320 of device 304A may send a message indicating the result of the comparison, e.g., that the count of packets sent from the network interface is greater than the count of the test packets sent by the application, and controller 302 may determine that the one or more KPI measurements based on the test packets from device 304A may be inaccurate and/or untrustworthy.

A receiver test agent 310B of network device 304B may receive test packet 330 (714). Test agent 310B of network device 304B may compute one or more performance measurements based on the test packet (test packet 330) (716). Test agent 210B of network device 204B sends the one or more performance measurements to controller 202 (718).

Controller 302 may receive the one or more performance measurements from receiver test agent 310B of network device 304B (720) and, in some examples, receive the message from sender test agent 310A of network device 304A that notifies controller 302 that the one or more performance measurements based on test packets sent by sender test agent 310A of network device 304A are inaccurate or may be inaccurate (722). In response to receiving the message notifying the controller that the one or more performance measurements are inaccurate or may be inaccurate, controller 302 outputs for display an indication of the one or more performance measurements and an indication that the one or more performance measurements are inaccurate or may be inaccurate (724). In some examples, controller 302 may remove the one or more performance measurements that are inaccurate from being output for display. In some examples, controller 302 may output for display an indication, such as a visual warning (e.g., warning icon), that the one or more performance measurements may be inaccurate.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various examples have been described. These and other examples are within the scope of the following claims.

What is claimed is:

1. A method comprising:
   sending, by an application executing on a sender device and to a receiver device, a test packet including a first timestamp indicating a time at which the test packet is generated by the application executing on the sender device;
   obtaining, by the sender device and from a network interface of the sender device, a second timestamp indicating a time at which the test packet is sent out of the sender device via the network interface of the sender device; computing, by the sender device, a time difference value between the second timestamp and the first timestamp;
   comparing, by the sender device, the time difference value with a threshold time value; and
   sending, by the sender device in response to comparing the time difference value with the threshold time value and if the time difference value exceeds the threshold time value, a message to a controller that indicates the one or more performance measurements based on the test packet are inaccurate, wherein the controller is distinct from the sender device and the receiver device.

2. The method of claim 1, wherein the second timestamp is generated by a hardware component of the network interface.

3. The method of claim 2, wherein the hardware component comprises a network interface card.

4. The method of claim 1, wherein the message includes a flag to indicate an issue in sending the test packet.

5. The method of claim 1, wherein the message specifies the time difference value.

6. The method of claim 1, further comprising dynamically adjusting, by the sender device and based on an evaluation of a plurality of time difference values, the threshold time value.

7. The method of claim 1, further comprising:
   prior to the comparing:
   receiving, via a management interface of the sender device, configuration information defining the threshold time value; and
   storing, by the sender device, the threshold time value.

8. The method of claim 1, further comprising:
   prior to the computing:
   receiving, via a management interface of the sender device, a command enabling a sender inaccuracy notification mode; and
   wherein the computing, comparing, and sending comprise performing the computing, comparing, and sending in response to receiving the command.

9. The method of claim 1, further comprising:
   sending, by the sender device, a plurality of test packets;
   obtaining, by the sender device and from the network interface of the sender device, a count of packets sent from the network interface;
   obtaining, by the sender device and from the application, a count of the one or more test packets sent by the application;
   comparing, by the sender device, the count of packets sent from the network interface and the count of the one or more test packets sent by the application to obtain a result of the comparing;
   determining, based on the comparing, that the count of packets sent from the network interface is less than the count of the one or more test packets sent by the application; and
   sending, by the sender device, a message to the controller indicating that the count of packets sent from the network interface is less than the count of the one or more test packets sent by the application, the message indicating the one or more performance measurements based on the one or more test packets are inaccurate.

10. The method of claim 1, further comprising:
    sending, by the sender device, a plurality of test packets;
    obtaining, by the sender device and from the network interface of the sender device, a count of packets sent from the network interface;
    obtaining, by the sender device and from the application, a count of the one or more test packets sent by the application;
    comparing, by the sender device, the count of packets sent from the network interface and the count of the one or more test packets sent by the application to obtain a result of the comparing;

determining, based on the comparing, that the count of packets sent from the network interface is greater than the count of the one or more test packets sent by the application;

detecting one or more packet drops from the network interface; and sending, by the sender device, a message to the controller indicating that the count of packets sent from the network interface is greater than the count of the one or more test packets sent by the application, the message indicating the one or more performance measurements based on the one or more packets may be inaccurate.

11. A sender device comprising:

a network interface; and one or more processors operably coupled to a memory, wherein the one or more processors are configured to:

send, by an application of the sender device and to a receiver device, a test packet including a first timestamp indicating a time at which the test packet is generated by the application executing on the sender device;

obtain, from a network interface of the sender device, a second timestamp indicating a time at which the test packet is sent out of the sender device via the network interface of the sender device;

compute a time difference value between the second timestamp and the first timestamp;

compare the time difference value with a threshold time value; and send, in response to comparing the time difference value with the threshold time difference value and if the time difference value exceeds the threshold time value, a message to a controller to notify the controller that one or more performance measurements based on the test packet are inaccurate, wherein the controller is distinct from the sender device and the receiver device.

12. The sender device of claim 11, wherein the second timestamp is generated by a hardware component of the network interface.

13. The sender device of claim 12, wherein the hardware component comprises a network interface card.

14. The sender device of claim 11, wherein the message includes a flag to indicate existence of a sender delay.

15. The sender device of claim 11, wherein the message specifies the time difference value.

16. The sender device of claim 11, wherein the threshold time value is dynamically adjusted by the sender device and based on an evaluation of a plurality of time difference values.

17. The sender device of claim 11, wherein the one or more processors are further configured to:

prior to the comparing:

receive, via a management interface of the sender device, configuration information defining the threshold time value; and store the threshold time value.

18. The sender device of claim 11, wherein the one or more processors are further configured to:

prior to the computing:

receive, via a management interface of the sender device, a command enabling a sender inaccuracy notification mode; and wherein the computing, comparing, and sending comprise performing the computing, comparing, and sending in response to receiving the command.

* * * * *